United States Patent
Perego et al.

(10) Patent No.: US 6,388,025 B1
(45) Date of Patent: May 14, 2002

(54) METHOD FOR INCREASING THE MOLECULAR WEIGHT OF POLYESTER RESINS

(75) Inventors: Gabriele Perego, Milan; Catia Bastioli; Gian Domenico Cella, both of Novara; Andrea Gardano, Trino, all of (IT)

(73) Assignee: Ministero Dell'Universita' e Della Ricerca Scientifica e Tecnologica, Rome (IT)

( * ) Notice: Subject to any disclaimer, the term of this patent is extended or adjusted under 35 U.S.C. 154(b) by 0 days.

(21) Appl. No.: 09/555,287

(22) PCT Filed: Nov. 27, 1998

(86) PCT No.: PCT/EP98/07624

§ 371 Date: Sep. 13, 2000

§ 102(e) Date: Sep. 13, 2000

(87) PCT Pub. No.: WO99/28367

PCT Pub. Date: Jun. 10, 1999

(30) Foreign Application Priority Data

Dec. 1, 1997 (IT) .......... TO97A1044
Dec. 1, 1997 (IT) .......... TO97A1042

(51) Int. Cl.[7] .............. C08F 20/00
(52) U.S. Cl. ........ 525/440; 528/288; 528/289; 528/492; 528/503
(58) Field of Search .............. 528/288, 289, 528/492, 503; 525/440

(56) References Cited

U.S. PATENT DOCUMENTS 3,853,821 A    12/1974    Sid-Ahmed et al. .... 260/75 NE

FOREIGN PATENT DOCUMENTS

| WO | WO 93/08226 | 4/1993 |
| WO | WO 94/26820 | 11/1994 |
| WO | WO 96/11978 | 4/1996 |
| WO | WO 97/30105 | 8/1997 |

OTHER PUBLICATIONS

Fakirov, Von Dr. S., Wiederverwertung thermoplastischer polykondensat–abfälle mit hilfe der nachkondensation im festen zustand, *Kunststoffe*, 1984, 74(4), XP–002099678, 218–221 (English abstract attached).

Primary Examiner—Samuel A. Acquah
(74) Attorney, Agent, or Firm—Woodcock Washburn LLP

(57) ABSTRACT

A method for increasing the molecular weight of aliphatic polyester resins from dicarboxylic aliphatic acids having 2–22 carbon atoms, or from hydroxy-acids having 2–22 carbon atoms, in which the solid resin is brought into contact with a chain extender preferably chosen from the organic disocyaciates.

11 Claims, No Drawings

METHOD FOR INCREASING THE MOLECULAR WEIGHT OF POLYESTER RESINS

The present invention concerns an improved method for increasing the molecular weight of aliphatic polyester resins.

As is well known, aliphatic polyester resins are prepared using methods of melt polycondensation, under vacuum conditions, of aliphatic hydroxy-acids having two or more carbon atoms, or from the corresponding lactones or lactides, or from aliphatic dicarboxylic acids with diols having two or more carbon atoms.

When working under the conditions indicated above, it is difficult to obtain polymers having molecular weights high enough for the preparation of films having mechanical properties of practical importance.

It is known that the molecular weight can be taken to the required levels by reacting the melted resin with chain extenders such as the diisocyanates. In order to avoid the formation of gels, which normally occurs when a diisocyanate is melt reacted with an aliphatic polyester, the quantity of diisocyanate must be accurately controlled with respect to the terminal hydroxyl groups of the resin, and a resin that has an average numerical molecular weight greater than at least 5,000 must preferably be used.

If molecular weights that are too low are used, there is too much gel formation.

A greater disadvantage of using the diisocyanates at high temperatures is constituted by the branching and/or cross-linking reactions that can arise using these compounds.

The presence of gels makes the polymer unsuitable for applications such as film preparation.

It has now unexpectedly been discovered that it is possible to increase, even significantly, the molecular weight of aliphatic polyester resins without the formation of gels and/or uncontrolled cross-linking by conducting the reaction leading to the increase in molecular weight (a re-grading reaction) at temperatures at which the resin is in the solid state, and using bi-functional chain extenders that react with addition reactions with the terminal OH groups of the resin.

The re-grading reaction is conducted by purring the solid resin in granular form in contact with the chain extender and operating at ambient temperature or a temperature slightly less than the melting point of the resin for sufficient time to obtain the desired increase in molecular weight.

The chain extender is used in its liquid state, homogeneously dispersed over the resin so that it can diffuse therein.

Because the method is conducted in the solid phase at low temperature, relatively long time periods are needed to obtain significant increases in molecular weight. In order to reduce the times needed to obtain significant increases in the molecular weight, the chain extender is mixed in the melted polymer using relatively short contact times, generally less than five minutes; this is in order to avoid undesirable cross-linking reactions.

The increase in the intrinsic viscosity of the resins to which the re-grading process of the invention is applied is at least 0.1–0.15 dl/g. The intrinsic viscosity of the resin after the re-grading is greater than 0.7 dl/g.

The intrinsic viscosity of the starting polyester resins can vary within a wide range; for example, they can have low values such as 0.1–0.15 dl/g, or high values such as 0.8–1.0 dl/g, or higher such as, for example, 1.5 dl/g, the viscosity being measured in $CHCl_3$.

The preferred chain extenders are the organic diisocyanates and polyisocyanates. They are used in sufficient quantities to react with the terminal OH groups of the resin. Quantities of diisocyanate providing more NCO-groups than is equivalent to the number of OH groups of the resin have a negative effect on the increase in molecular weight, that is, in this case the diisocyanates do not react with both functional groups and, therefore, the reaction does not lead to an increase in molecular weight.

The quantity of diisocyanate or polyisocyanate is between 0.2 and 1 NCO equivalent per OH group of the resin.

The quantity of diisocyanate or polyisocyanate expressed in weight is generally between 0.01 and 3% of the resin, and preferably between 0.1 and 2%.

The organic diisocyanates and polyisocyanates are chosen from compounds such as the following:

a) compounds having the formula: $OCN(CH_2)_nNCO$, in which n is an integer between 2 and 20; tetramethylenediisocyanate, hexamethylenediisocyanate, dodecamethylenediisocyanate are representative compounds;

b) diisocyanates as in a), in which one or more of the hydrogen atoms of the $CH_2$ groups are replaced by aliphatic radicals; 4-butylhexamethylenediisocyanate and 2,2,-4-trimethylhexamethylenediisocyanate are representative compounds;

c) diisocyanates such as in a) and b), in which one or more of the non-adjacent $CH_2$ groups is replaced by —O—, —S— or —NR— groups, in which R is hydrogen or a hydrocarbon radical;

d) aromatic diisocyanates possibly having condensed rings, such as toluene-2,4-diisocyanate, p-phenylenediisocyanate;

e) diisocyanates having the formula $OCN-A_2-X-A_2-NCO$, in which $A_2$ is a bivalent aryl radical, X is an —O—, —S—, $SO_2$—, —SO—, —CO— group, a bivalent hydrocarbon radical or a direct bond between the $A_2$ groups; examples of these diisocyanates are 3,3'-, 4,4'- and 3,4'-diphenylmethanodiisocyanate, 2,2-diphenylpropanodiisocyanate, 4,4'-diphenyldiisocyanate.

Dimers, trimers and tetramers of the diisocyanates can be used.

The aromatic diisocyanates can give rise to problems of colour in the polymer; on the other hand, the aliphatic diisocyanates are free from this disadvantage but are less reactive.

The preferred diisocyanates are hexamethylenediisocyanate, diphenylmethanodiisocyanate and isophoronediisocyanate.

Examples of other chain extenders that can be sued are the diepoxides and the dianhydrides of aromatic tetracarboxylic acids, such as pyromellitic dianhydride.

The aliphatic polyester resins to which the re-grading method of the invention is applied are resins containing terminal OH groups, and include aliphatic polyesters, aliphatic/aromatic co-polyesters, co-polyester ethers, polyester-ether-amides, urethane-polyesters and carbamide-polyesters, in which the polyester or the sequence or the repeating aliphatic units of the co-polymers are obtained from aliphatic dicarboxylic acids having 2–22 carbon atoms and from aliphatic, aromatic or cyclo-aliphatic diols having 2–22 atoms, or from hydroxy-acids having 2–22 carbon atoms, or from the corresponding lactones or lactides, or from mixtures of dicarboxylic acids with mixtures of diols or from mixtures thereof with mixtures of hydroxy-acids or lactones and lactides.

The preferred dicarboxylic acids are succinic acid and adipic acid; pimelic, suberic, azelaic, sebacic and brassilic acids; the preferred hydroxy-acids or lactones are 6-hydroxycaproate and 1'ε-caprolactone and the hydroxybutyric acids, hydroxyvalerianic acid, 9-hydroxy-nonoic acid, 10-hydroxy-decanoic acid and 13-hydroxy-tridecancarboxylic acid.

The diols utilised for the preparation of the resins from dicarboxylic acids are aliphatic, aromatic and cycloaliphatic diols having 2–22 carbon atoms.

Preferred diols are 1,2-ethandiol, 1,4-butandiol, 1,6-hexandiol, 1,7-heptandiol, 1,10-decandiol, 1,12-dodecandiol, 1,4-cyclohexandimethylol and 1,4-cyclohexandiol.

Preferred resins are poly-ε-caprolactone, polyethylene and polybutylene-succinate, polyhydroxybutyrate-hydroxyvalerate, polylactic acid, polyalkyleneadipate, polyalkyleneterephthalate, polyalkyleneadipate-ε-caprolactam, poly-ε-caprolactone/ε-caprolactam, polybutylene-adipate-co-terephthalate, poly(1,10-decandiyl-decandionate) and poly(1,10-decandiyl-nonandionate), poly-tetramethylenesebacate, poly-hexamethylenesebacate.

The preparation of the resins using melt polycondensation is conducted at temperatures of between 180 and 230° C. in the presence of known catalysts such as, for example, tetraisopropyltitanium and titanium acetylacetonate. The molecular weight obtainable by means of polycondensation is generally not greater than 10,000.

It is also possible to conduct the polycondensation in the presence of polyfunctional compounds having three or more groups that are reactive with the terminal OH and COOH groups, such as trimethylolpropane, pentaerythritol and trimellitic anhydride.

The quantity of polyfunctional compound is generally between 0.1 to 5% in moles per 100 moles of dicarboxylic acid or hydroxy-acid.

The polymers that can be obtained using the process of the invention are substantially free of gels and have optimal mechanical characteristics.

They are utilisable other than in the preparation of films that can be single or multi-layered, mono- or bi-orientated, as well as in all applications in which aliphatic polyester resins are required that have relatively high intrinsic viscosities (greater than 0.7 dl/g). Examples of such applications are semi-expanded and expanded materials, moulded articles for the agglomeration of pre-expanded particles, fruit and vegetable containers, bottles for the grocery, cosmetic and pharmaceutical sectors, fishing nets, bags for organic refuse and grass cuttings and the like.

It has been found, and this constitutes a further aspect of the invention, that in the polymers that have been re-graded according to the method of the invention and that have an intrinsic viscosity greater than 0.7 dl/g, the ratio R between the intrinsic velocity and the melt flow index measured at 180° under 5 kg of weight is greater than 0.1.

The following examples are only illustrative, but do not constitute a limitation of the invention.

EXAMPLE 1

A sample of 10.0 g of polycaprolactonediol (Solvay Interox, CAPA 220) having an intrinsic viscosity of 0.15 dl/g was placed in a two necked glass flask, exposed to nitrogen, and 800 mg of 1,6-hexamethylenediisocyanate added thereto. The contents of the flask were agitated for 15 minutes in order to assist the homogeneous dispersion of the diisocyanate, and the temperature was then taken to 50° C. in an oil bath. The viscosity of the polymer changed from 0.15 dl/g to 0.85 dl/g in four days.

EXAMPLE 2

10 kg of poly-ε-caprolactone (PCL-787 Union Carbide) were introduced into a Universal 15L mixer and 40 ml of hexamethylenediisocyanate added using a dropping funnel. The addition of the reagent, carried out while maintaining the polymer under agitation, lasted 5 minutes; the agitation was then continued for a further 15 minutes. At the end, the contents were transferred to a polythene bag which was closed and placed in a ventilated oven kept at 50° C.

After fourteen days, the MRF of the PCL had gone from 7.0 g/10 min to 2.5 g/10 min, while the intrinsic viscosity in $CHCl_3$ at 30° C. had increased from 1.26 dl/g to 1.45 dl/g.

EXAMPLE 3

100 g of Eastman 14776 polyester granules, a co-polymer based on adipic acid, terephthalic acid and butandiol, were agitated in a 500 ml flask and 500 mg of hexamethylenediisocyanate added. After further agitation for 15 minutes, the temperature was raised to 70° C. in an oil bath.

After 72 hours, the viscosity of the polymer had increased from 0.85 dl/g in $CHCl_3$ at 30° C. to 1.25 dl/g.

EXAMPLE 4

101 g of sebacic acid (0.499 moles) and 99.85 g of 1,10-decandiol (0.550 moles) were placed in a 600 ml glass reactor provided with a stainless steel mechanical agitator and still.

The temperature was gradually taken to 200° C. in an oil bath, removing the reaction water. 0.15 g of $Ti(OBu)_4$ were then added, maintaining a moderate agitation and then reducing the pressure to 0.2 mm Hg. The reaction system was left under these conditions for 4 hours, obtaining a white crystalline polymer having an intrinsic viscosity of 0.61 dl/g, which was ground to obtain 3–4 mm granules.

EXAMPLE 5

A sample of 10.0 g poly(1,10-decandiol-decandionate) prepared according to Example 1 was placed in a two necked glass flask, in the presence of nitrogen, and 100 mg of 1,6-hexamethylenediisocyanate (HDI) added thereto. The contents of the flask were agitated for 15 minutes to assist in the homogeneous dispersion of the diisocyanate, and the temperature was then taken to 60° C. in an oil bath. The intrinsic viscosity of the polymer changed from 0.61 dl/g to 1.21 dl/g in two and a half days.

EXAMPLE 6 a sample of 10.0 g poly(1,10-decandiol-decandionate) prepared according to Example 1 was placed in a two necked glass flask, exposed to nitrogen, and 200 mg of 1,6-hexamethylenediisocyanate (HDI) added thereto. The contents of the flask were agitated for 15 minutes to assist in the homogeneous dispersion of the diisocyanate, and the temperature was then taken to 60° C. in an oil bath. The intrinsic viscosity of the polymer changed from 0.61 dl/g to 0.94 dl/g in two and a half days.

EXAMPLE 7

A sample of 10.0 g poly(1,10-decandiol-dicandionate) prepared according to Example 1 was placed in a two necked glass flask, exposed to nitrogen, and 100 mg of 1,6-hexamethylenediisocyanate (HDI) were added thereto. The contents of the flask were agitated for 15 minutes to assist in the homogeneous dispersion of the diisocyanate, and the temperature was then taken to 70° C. in an oil bath. The intrinsic viscosity of the polymer changed from 0.61 dl/g to 1.27 dl/g in four days.

COMPARISON EXAMPLE 1

A sample of 10.0 g of poly(1,10-decandiol-decandionate) prepared according to Example 4 and having an intrinsic viscosity of 0.52 dl/g was placed in a four necked glass flask provided with a mechanical agitator and exposed to nitrogen. The temperature was taken to 160° C. and 100 mg of 1,6-hexamethylenediisocyanate (HDI) were added under gentle mechanical agitation. The intrinsic viscosity of the polymer changed from 0.52 dl/g to 0.78 dl/g in fifteen hours. The solution of the polymer in $CHCl_3$ contained gels.

COMPARISON EXAMPLE 2

A sample of 87 g of poly(1,10-decandiol-nonandionate) prepared according to Example 4 and having an intrinsic viscosity of 0.80 dl/g was placed in a four necked glass flask provided with a mechanical agitator and exposed to nitrogen. The temperature was taken to 160° C. and 150 mg of 1,6-hexamethylenediisocyanate (HDI) were added under gentle mechanical agitation. After one hour of agitation, the addition was repeated and, after a further hour of reaction, a third addition of hexamethylenediisocyanate was made (to give a total of 0.45 g), and heating continued for a further hour. It was not possible to determine the intrinsic viscosity of the reaction product due to its insolubility in chloroform, clearly because of cross-linking.

What is claimed is:

1. A method for increasing the molecular weight of polyester resins having terminal hydroxyl groups and selected from the group consisting of aliphatic polyesters, aliphatic-aromatic copolyesters, polyester-amides, polyester-ether-amides, urethane polyesters and carbamide polyesters, wherein said resins are derived from aliphatic dicarboxylic acids having 2 to 22 carbon atoms and aliphatic, aromatic or cyclo-aliphatic diols having 2 to 22 carbon atoms, or from aliphatic hydroxy-acids having 2 to 22 atoms, or from the corresponding lactones or lactides, comprising contacting said resin in its solid state with an aliphatic or aromatic diisocyanate or a polyisocyanate and reacting the resin at room temperature or at a temperature lower than its melting point and not higher than the melting point of poly(1,10-decandiol-decandionate), said di or polyisocyanate being used in a sufficient quantity and being reacted for a sufficient time to obtain an increase in molecular weight corresponding to at least 0.1 dl/g unit of the intrinsic viscosity of the starting resin.

2. A method according to claim 1, in which the intrinsic viscosity of starting resin is between 0.1 and 1.5 dl/g measured in chloroform at 30° C.

3. A method according to claim 2, in which the intrinsic viscosity is between 0.15 and 1.0 dl/g.

4. A method according to claim 1, in which the di- or polyisocyanate is used in a quantity equal to from 0.2 to 1 equivalent NCO groups per terminal hydroxyl group of the resin.

5. A method according to claim 4, in which the quantity of di- or polyisocyanate is between 0.01 and 3% in weight of the resin.

6. A method according to claim 1, in which the diisocyanate is selected from the group consisting of:

(a) diisocyanates having the formula $OCN-(CH_2)_n-NCO$, in which n is an integer between 2 and 20;

(b) diisocyanates of the formula (a), in which one or more of the hydrogen atoms of the methylene group is replaced with a hydrocarbon radical;

(c) diisocyanates having the formula (a) or (b), in which one or more non-adjacent methylene groups is replaced by $-O-$, $-S-$, or $-NR-$ groups, in which R is hydrogen or a hydrocarbon radical;

(d) aromatic diisocyanates having condensed rings; and (e) diisocyanates of the formula $OCN-A_2-X-A_2-NCO$, in which $A_2$ is a bivalent aryl radical, X is an $-O-$, $-S-$, $-SO_2-$, $-SO-$, or $-CO-$ group or a direct link between the $A_2$ groups.

7. A method according to claim 6, in which the diisocyanate is selected from the group consisting of hexamethylenediisocyanate, tetramethylenediisocyanate, diphenylmethanodiisocyanate (MDI), isophoronediisocyanate, hydrogenated MDI, 2,4-toluenediisocyanate, 2,6-toluenediisocyanate, p,p'-diphenyldiisocyanate, and xylylenediisocyanate.

8. A method according to claim 1, in which the starting polyester resin is selected from the group consisting of poly-ε-caprolactone, polyethylene- or polybutylene-succinate, polyhydroxybutyrate-hydroxyvalerate, polylactic acid, polybutyleneadipate-co-terephthalate, polybutyleneadipate-ε-caprolactone, poly(1,10-decandiyl-decandionate), poly(1,10-decandiyl-nonandionate), poly-tetramethylenesebacate and poly-hexamethylenesebacate.

9. A method according to claim 1, in which the polyester resin is obtained from mixtures of aliphatic dicarboxylic acids having 2–22 carbon atoms and mixtures of aliphatic, aromatic or cycloaliphatic diols having 2–22 carbon atoms, or from mixtures thereof with mixtures of aliphatic hydroxy-acids having 2–22 carbon atoms or their lactones or lactides.

10. Polyester resins having an intrinsic viscosity in chloroform at 30° C. greater than 0.7 dl/g, substantially free of gels, and prepared according to the methods of claim 1.

11. Polyester resins having an intrinsic viscosity in chloroform at 30° C. greater than 0.7 dl/g, in which the ratio between the intrinsic viscosity and the melt flow index measured at 180° under 5 kg of load is greater than 0.1 prepared according to the methods of claim 1.

* * * * *

UNITED STATES PATENT AND TRADEMARK OFFICE
CERTIFICATE OF CORRECTION

PATENT NO. : 6,388,025 B1
DATED : May 14, 2002
INVENTOR(S) : Gabriele Perego et al.

It is certified that error appears in the above-identified patent and that said Letters Patent is hereby corrected as shown below:

Column 1,
Line 41, "purring" should read -- putting --.

Column 4,
Line 51, "a" should read -- A --.

Signed and Sealed this

Twenty-third Day of July, 2002

Attest:

JAMES E. ROGAN
Attesting Officer  Director of the United States Patent and Trademark Office